(12) United States Patent
Landrot

(10) Patent No.: US 6,305,297 B1
(45) Date of Patent: Oct. 23, 2001

(54) RAILWAY VEHICLE BOGIE AND PROCESS FOR MANUFACTURING A SIDE MEMBER OF SUCH A BOGIE

(75) Inventor: Alain Landrot, Le Creusot (FR)

(73) Assignee: Alstom Transport SA, Paris (FR)

( * ) Notice: Subject to any disclaimer, the term of this patent is extended or adjusted under 35 U.S.C. 154(b) by 0 days.

(21) Appl. No.: 09/333,270

(22) Filed: Jun. 15, 1999

(30) Foreign Application Priority Data

Jun. 18, 1998 (FR) .................................................. 98 07683

(51) Int. Cl.⁷ ...................................................... B61F 3/00
(52) U.S. Cl. .................... 105/182.1; 105/157.1; 105/206.1
(58) Field of Search ................................ 105/167, 206.1, 105/206.2, 157.1, 182.1; 267/148

(56) References Cited

U.S. PATENT DOCUMENTS

| 36,657 | * | 10/1862 | Lamb | 105/206.1 |
|---|---|---|---|---|
| 285,675 | * | 9/1883 | Post | 105/206.1 |
| 1,186,987 | * | 6/1916 | Hewitt | 105/206.1 |
| 2,357,020 | * | 8/1944 | Nystrom | 105/206.1 |
| 4,422,627 | * | 12/1983 | Schmidt et al. | 267/148 |
| 4,715,589 | * | 12/1987 | Woerndle | 267/148 |
| 5,123,358 | * | 6/1992 | Kemppainen et al. | 105/167 |

FOREIGN PATENT DOCUMENTS

| 569676 | 7/1958 | (BE) . |
|---|---|---|
| 1804605 | 12/1969 | (DE) . |
| 0547010 | 6/1993 | (EP) . |

* cited by examiner

Primary Examiner—S. Joseph Morano
Assistant Examiner—Lars A. Olson
(74) Attorney, Agent, or Firm—Dowell & Dowell, P.C.

(57) ABSTRACT

A railway vehicle bogie, including at least two axles, at least one side member being provided to connect the axles to a central part of the bogie. The side member is formed by an elastic blade shaped as a vertically oriented continuous flattened loop which may be made of composite material or of metal. A process for manufacturing a side member of composite material consists in winding a continuous lap of reinforcing fibers over at least one turn around two studs so as to form a loop, and polymerizing a resin-based matrix around the fibers.

15 Claims, 4 Drawing Sheets

RAILWAY VEHICLE BOGIE AND PROCESS FOR MANUFACTURING A SIDE MEMBER OF SUCH A BOGIE

BACKGROUND OF THE INVENTION

1. Field of the Invention

The present invention relates to a railway vehicle bogie and to a process or manufacturing a side member for such a bogie.

2. Description of the Related Art

A railway vehicle bogie is intended to support a vehicle, such as a car body or motor car body, on a plurality of wheels supported on axles. Taking into account the masses of the car bodies or motor car bodies and their speed of movement, the forces due to accelerations of this stock, particularly during changes of direction, are considerable, with the result that it is usual to produce bogies in the form of massive parts made of steel or of welded structure. These massive pieces and welded structures are rigid and must be equipped with suspension and damping systems to ensure comfort for passengers or the absorption of vibrations due to irregularities of track on which the stock moves.

European Patent Application 0 031 008 discloses a railway vehicle bogie comprising H-shaped webs made of composite material. These webs do not enable the forces due to the vertical and transverse accelerations of the equipment in motion to be efficiently absorbed and do not allow the assembly of accessory or safety elements such as a motor, a braking system or a control system. In order efficiently to resist the dynamic stresses to which they are subjected, these webs should have a large cross-section, which would consume a large amount of composite material. This would increase the cost of the bogie and might raise technical problems of molding.

It is a particular object of the present invention to overcome these drawbacks by proposing a bogie of which the side members present such a shape that they participate efficiently in the suspension of the vehicle.

SUMMARY OF THE INVENTION

To that end, the invention relates to a railway vehicle bogie, this bogie being in abutment on wheels distributed on at least two axles, at least one side member being provided to connect the axles to a central part of the bogie, characterized in that the side member is formed by an elastic blade shaped as a flattened loop.

Thanks to the invention, the geometry of the side member enables it to perform at the same time:

- a function of supporting the vehicle between the axles,
- a function of suspension of the railway vehicle,
- a function of damping the vibrations between the axles and the vehicle,
- and this, while ensuring drive of the box body or rail car with the functions of traction, braking and guiding on the track.

In addition, the particularly simple geometry of the side member leads to an attractive cost, which improves the overall economic performances of the bogie.

According to a first advantageous embodiment of the invention, the elastic blade is made of composite material based on fiber-reinforced plastics resin. In that case, the bogie made is substantially lighter than the conventional steel devices, this making it possible to increase the load embarked on the vehicle. The suppleness of a composite material enables it to provide efficient damping at the vibratory frequences most often active in a bogie. In addition, a bogie made of composite material according to the invention may be manufactured more easily than a conventional bogie, particularly due to its simple geometry. The composite material may be based on epoxide, phenolic or other resin and reinforced with glass, carbon, aramid and/or other specific fibers allowing a possible failure of the material to be detected.

According to another embodiment of the invention, the elastic blade may be made of metal, preferably spring steel. This second embodiment makes it possible to use a conventional material whose properties are well known in the field of railway construction.

According to another advantageous aspect of the invention, the bogie comprises at least one shock absorber disposed in the interior volume of the side member. This shock absorber is stressed as a function of the elastic deformations of the blade forming the side member.

According to another advantageous aspect of the invention, the elastic blade is constituted by two elongated webs and two curved zones fixed with respect to axle boxes of the wheels. In this way, the side member is fixed at its two ends thanks to the two curved zones. In that case, it may be provided that at least one axle box comprises a projecting part around which is disposed a curved zone of the elastic blade. This curved zone is advantageously fixed on this projecting part by gluing, or mechanically.

According to another advantageous aspect of the invention, the projecting part comprises two substantially opposite surfaces against which corresponding surfaces of the elongated webs of the elastic blade are adapted to abut. This geometry of the projecting part and of the elastic blade avoids a pivoting of the blade around the projecting part, which improves fixation between these two elements.

According to another aspect of the invention, the bogie comprises two side members each formed by an elastic blade, these side members being connected to a common chassis. This chassis may support the vehicle and be equipped with a suspension member. In that case, it may be provided that each side member is connected to the chassis, at the level of an upper web and at the level of a lower web of the loop that it forms.

The invention also relates to a process for manufacturing a side member, in the case of a side member made of composite material as described hereinbefore. This process consists in:

- winding a continuous lap of reinforcing fibers, over at least one turn, around two studs, so as to form a loop around these two studs, and
- polymerizing a resin-based matrix around these fibers.

Thanks to the process of the invention, a side member can be produced particularly simply and economically.

According to an advantageous aspect of the process of the invention, said process consists in adapting the distance between the studs as a function of the wheel base and/or the load provided on the side member. According to another advantageous aspect, the process consists in adapting the number of winding turns of the lap around the studs as a function of the dimensions and/or the rigidity provided for the side member. The process of the invention is very adaptable to the operational characteristics of the side member, with the result that several types of side members may be manufactured in the same installation, which is particularly advantageous from the industrial standpoint.

BRIEF DESCRIPTION OF THE DRAWINGS

The invention will be more readily understood and other advantages thereof will appear more clearly on reading the following description of two embodiments of a railway vehicle bogie and its process of manufacture, according to the invention, given solely by way of example and made with reference to the accompanying drawings, in which.

DESCRIPTION OF PREFERRED EMBODIMENTS

Figure 1:
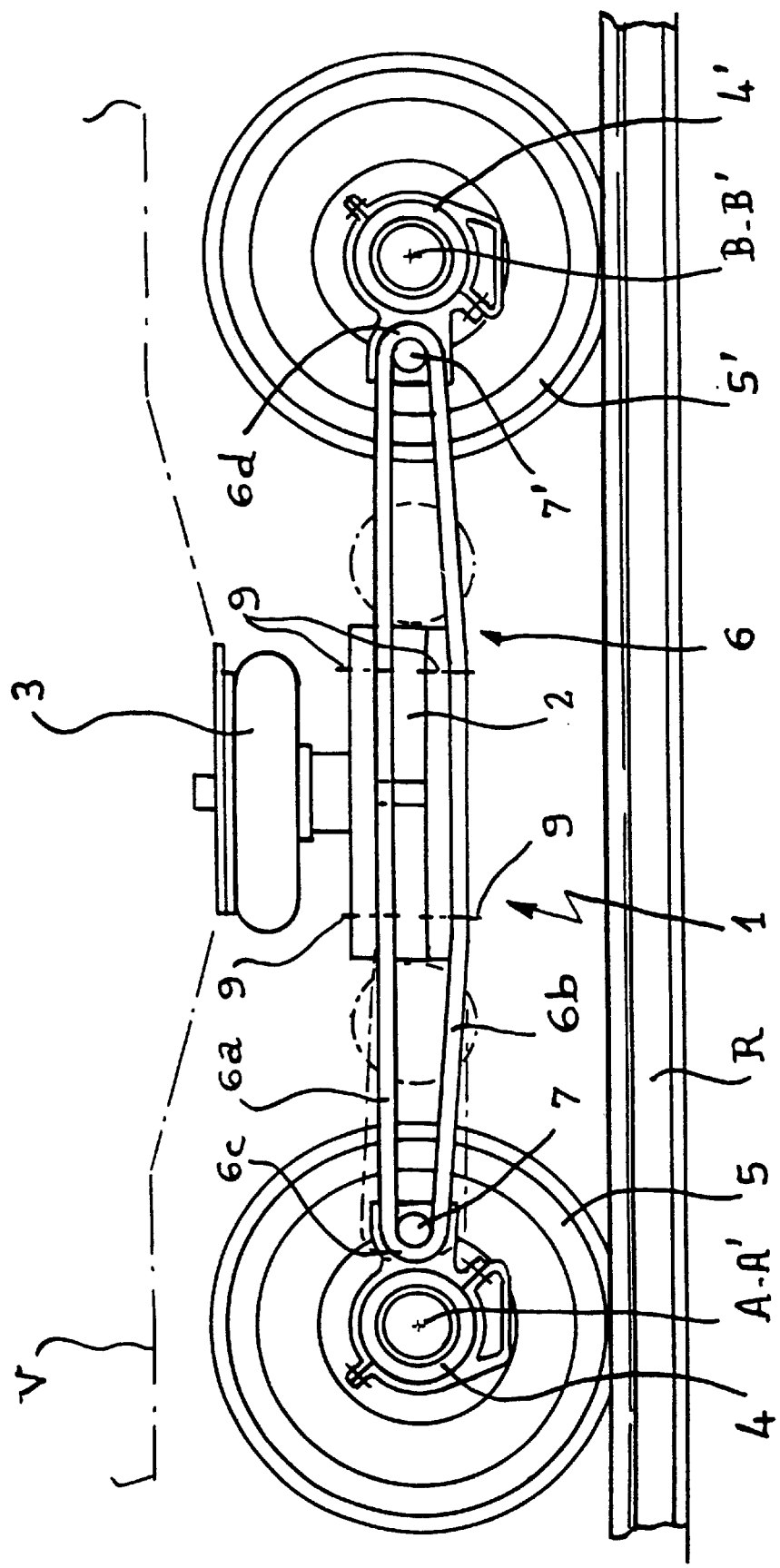
FIG. 1 is a side view of a railway vehicle bogie according to the invention.

Referring now to the drawings, the bogie 1 shown in FIG. 1 is intended to support a railway vehicle V, shown in dashed and dotted lines, in abutment on rails, of which only one, referenced R, is visible in FIG. 1. This bogie 1 comprises a chassis 2 on which is disposed a secondary suspension assembly 3 interposed between the chassis 2 and the box body of the vehicle V. The chassis 2 is supported by axle boxes 4 and 4' of two axles represented by axes of rotation A–A' and B–B' of two sets of wheels 5 and 5'. Two side members 6 and 6' are taut between the chassis 2 and the axle boxes 4 and 4'.

According to the invention, each side member 6 is formed by an elastic blade shaped as a flattened loop.

More precisely, the side member 6 comprises an upper web or tie 6a and a lower web or tie 6b which are formed in a continuous elongated loop in shape and extend over substantially the whole length included between two pins 7 and 7' projecting with respect to the axle boxes 4 and 4'. The side members 6 also comprise two integral curved zones 6c and 6d disposed respectively around axes 7 and 7' and connecting the webs 6a and 6b.

The side member 6 is made of composite material based on glass-fiber reinforced epoxide resin. This is a light structure, which has excellent mechanical properties, while its cost may be relatively low. Other composite materials may be envisaged as a function of the technological choices of the person skilled in the art.

The curved zones 6c and 6d of the side member 6 are glued on the projecting pins 7 and 7' so as to produce a rigid assembly of the axle boxes 4 and 4' with the side member 6. Assembly by gluing is particularly suitable for a side member made of composite material, as the choice of the glue may be made as a function of this material.

As for the chassis 2, it is fixed by any suitable means, for example by screws, represented by their axis lines 9, on the two webs 6a and 6b. The chassis 2 and the side member 6 thus constitute a rigid assembly in the central part of the bogie 1.

The webs 6a and 6b may be designed as fixed beams at the level of the screws 9 and subjected to vertical efforts at the level of the curved zones 6c and 6d. Their suppleness is advantageously employed to allow a clearance as shown in dashed and dotted lines to the left in FIG. 1. Such clearance therefore allows the side member 6, on being deformed, to perform a function of suspension.

Moreover, the nature of the material used for constituting the side member 6 is such that the latter returns naturally towards its position represented in solid lines, with the result that it efficiently dampens the possible vibrations created between the axle boxes 4 and 4' and the chassis 2.

Side member 6' is identical to side member 6.

Figure 2:
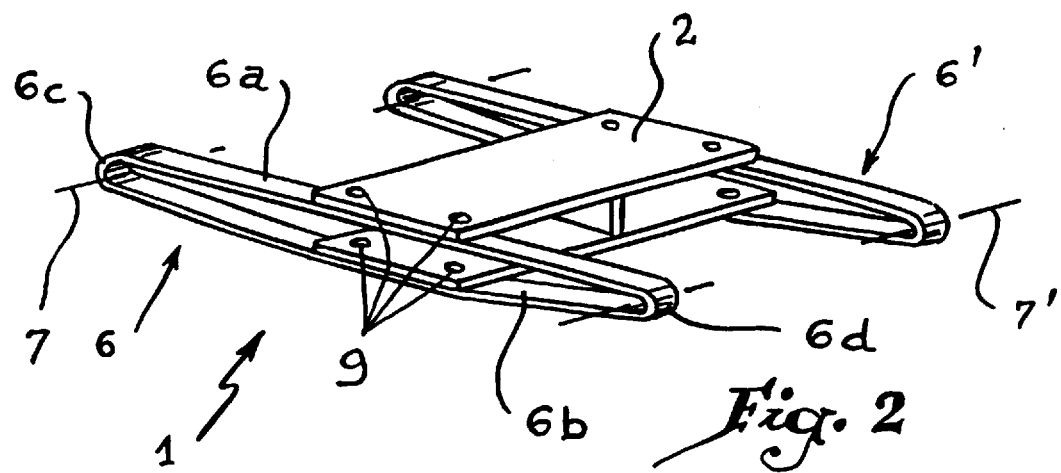
FIG. 2 schematically shows, in perspective, the principle of the bogie of FIG. 1, without the accessory elements that it supports.

As shown more particularly in FIG. 2, the structure of the bogie 1 is simple, being essentially constituted by the chassis 2 and the two side members 6 and 6', with the result that its cost is particularly attractive, in particular when it is made of glass-fiber reinforced epoxide resin.

Figure 3:
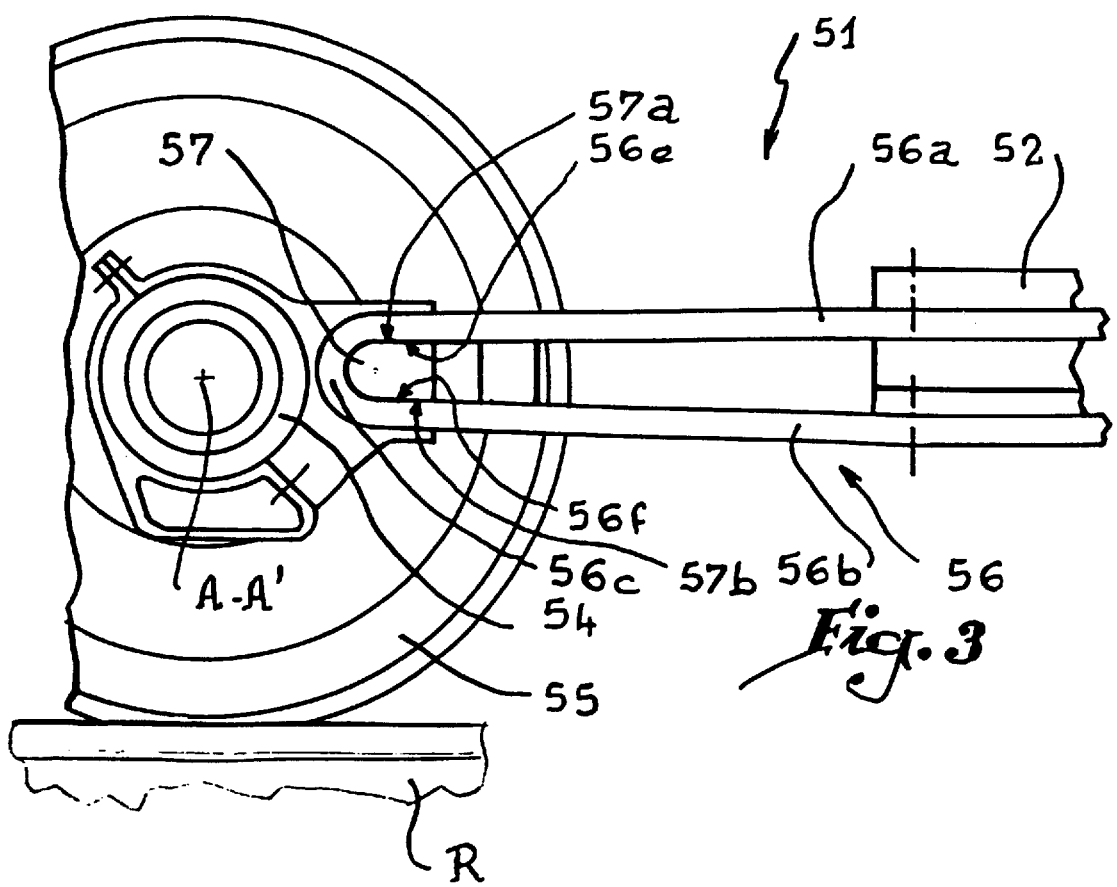
FIG. 3 is a side view, on a larger scale, of a part of a bogie in accordance with a second embodiment of the invention.
Figure 4:
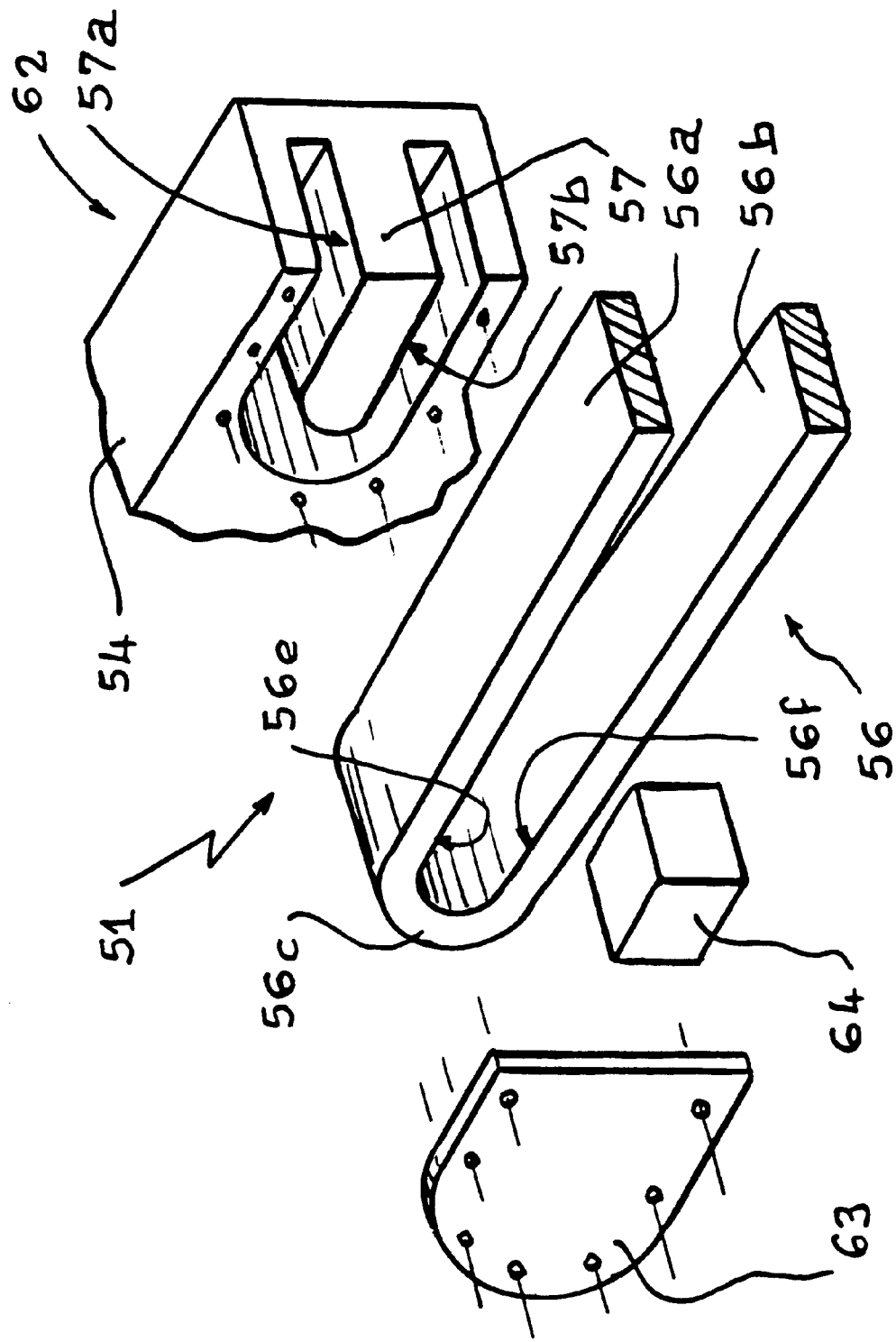
FIG. 4 is a partial exploded perspective of certain elements constituting the bogie shown in FIG. 3.

In the second embodiment of the invention shown in FIGS. 3 and 4, elements similar to those of the embodiment of FIGS. 1 and 2 bear identical references increased by 50. In this embodiment, a bogie 51 comprises a chassis 52 supporting a suspension assembly (not shown), while side members, of which only one, referenced 56, is visible in FIGS. 3 and 4, are taut between the chassis 2 and the axle boxes, of which only one, referenced 54, is visible, this axle box defining an axis of rotation A–A' of wheels 55.

The side member 56 is made of spring steel and comprises an upper web or tie 56a and a lower web or tie 56b connected by two curved zones, of which only one, referenced 56c, is visible. The curved zone is disposed around a projecting part 57 of the axle box 54 on which it is mechanically fixed. More precisely, the projecting part 57 is in the form of a heel and comprises an upper surface 57a and a lower surface 57b which are substantially plane, against which corresponding surfaces 56e and 56f belonging respectively to the elongated webs 56a and 56b may abut. In this way, no rotation of the side member 56 around the projecting part 57 is possible, this improving anchoring of the side member with respect to the projecting part.

The projecting part 57 is formed inside an envelope 62 provided with a cover 63, such envelope and cover being provided to hold the ends of the webs 56a and 56b and the curved zone 56c around the projecting part 57. This makes it possible to protect the assembly made between the side members 56 and the projecting part 57.

A damping block 64, made for example of elastomer, is disposed between the webs 56a and 56b, which makes it possible to react to the deformations of these webs and therefore to contribute to damping the vibrations. The use of an elastomer block is particularly simple; however, other damper devices might be installed in the interior volume of the side member, i.e. between the webs 56a and 56b.

A damper such as an elastomer block might, of course, also be used with the device of the first embodiment of the invention shown in FIGS. 1 and 2. Similarly, the geometry of the heel 57 is transposable with a bogie made of composite material.

Figure 5:
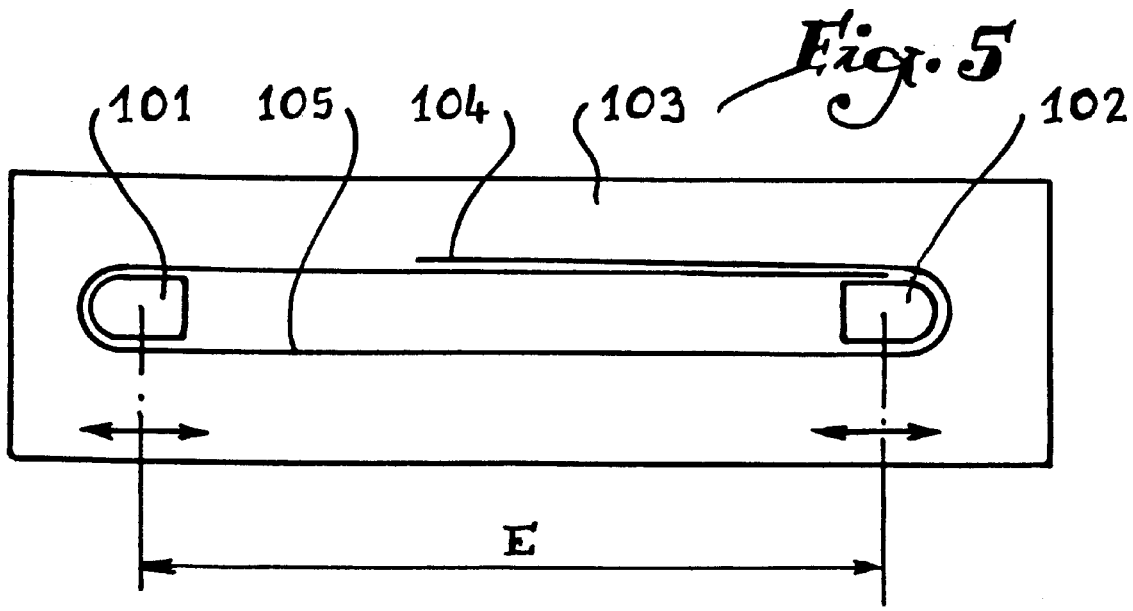
FIG. 5 schematically shows a step of manufacturing a bogie side member as used in the device of FIGS. 1 to 3.
Figure 6:
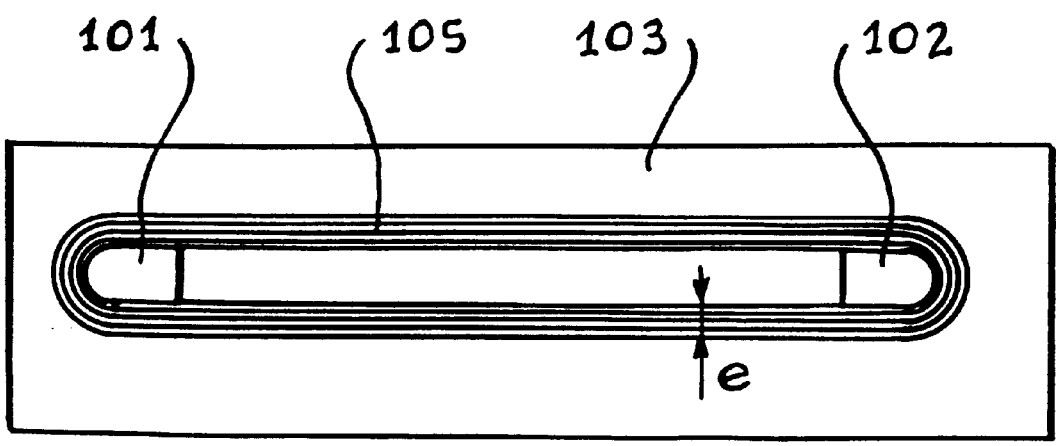
FIG. 6 is a view similar to FIG. 5 during a subsequent manufacturing step.

Manufacture of a side member made of composite material, particularly of the type shown in FIGS. 1 and 2, is described with reference to FIGS. 5 and 6.

Two studs 101 and 102 are mounted on a plate 103 and their distance E is adjusted as a function of the dimensions desired for the side member to be manufactured. When this distance has been adjusted, a continuous lap 104 of glass fibers is wound around these two studs 101 and 102 over at least one turn, preferably over a large number of turns so as to constitute a closed loop 105. This loop is resistant from the mechanical standpoint, as the reinforcing fibers extend over the whole length of the loop. When several turns have been made, as shown in FIG. 6, it is possible to dispose the assembly thus formed inside an oven, in accordance with a technique known in the field of composite materials.

According to an advantageous variant of the invention, the lap 104 may include one or more fibers for detecting failure of the composite material. These fibers may be constituted by copper filaments or optical fibers. Rupture thereof indicates the beginning of damage of the side member; this may be monitored automatically.

The number of winding turns of the lap 104 depends on the desired thickness e.

Distance E is determined as a function of the wheel base of the bogie while thickness e results from the calculation of the rigidities made as a function of the load provided on the side member, particularly as a function of the type of vehicle V.

What is claimed is:

1. A railway vehicle bogie including a central portion and at least two spaced axles which are each supported at their ends in spaced axle boxes, at least one side member extending between and being connected to the axle boxes and to said central portion of the bogie, and wherein said at least one side member is formed by an elastic blade shaped as a flattened continuous loop having upper and lower vertically spaced elongated webs.

2. The bogie of claim 1, wherein said elastic blade is made of a composite fiber-reinforced plastic resin material.

3. The bogie of claim 1, wherein said elastic blade is made of metal.

4. The bogie of claim 1, including at least one damper disposed within said loop and extending between said upper and lower webs.

5. The bogie of claim 1, wherein said elastic blade includes two vertically curved zones extending between said upper and lower webs and which curved zones are fixed with respect to two of said axle boxes on one side of the bogie.

6. The bogie of claim 5, wherein at least one of said two axle boxes includes a projecting part around which is disposed one of said curved zones of said elastic blade.

7. The bogie of claim 6, wherein said one of said curved zones of said elastic blade is fixed on said projecting part by gluing.

8. The bogie of claim 6, wherein said projecting part includes opposite surfaces against which surfaces of said elastic blade are adapted to abut.

9. The bogie of claim 6 in which said projecting part is formed by a curved slot in said at least one of said two axle boxes, said curved slot being of a configuration to cooperatively receive said one of said curved zones therein, and means for retaining said one of said curved zones within said curved slot.

10. The bogie of claim 9, including two side members connected to said central portion on opposite sides thereof.

11. The bogie of claim 1 including two side members connected to said central portion on opposite sides thereof.

12. The bogie of claim 1 wherein said elastic blade is made of spring steel.

13. A process for manufacturing a side member of a railway vehicle bogie wherein the side member is an elastic blade shaped as a flattened continuous loop having vertically spaced upper and lower elongated webs and opposite curved zones, comprising the steps of:

winding a continuous lap of reinforcing fibers over at least one turn around two studs so as to form a loop around the studs, and polymerizing a resin-based matrix around the fibers.

14. The process of claim 13, including setting a distance between said studs as a function of a wheel base or a load projected to be supported by said side member.

15. The process of claim 13, including varying a number of winding turns of said lap around said studs as a function of a predetermined rigidity required for said side member.

* * * * *